May 25, 1954 H. H. LAUCKS 2,679,257
TURBINE AND CONTROL MEANS THEREFOR
Filed Dec. 27, 1951 3 Sheets-Sheet 1

INVENTOR.
HOWARD H. LAUCKS
BY
*Herbert L. Davis, Jr.*
ATTORNEY

May 25, 1954 — H. H. LAUCKS — 2,679,257
TURBINE AND CONTROL MEANS THEREFOR
Filed Dec. 27, 1951 — 3 Sheets-Sheet 2

INVENTOR.
HOWARD H. LAUCKS
BY
Herbert L. Davis, Jr.
ATTORNEY

May 25, 1954 — H. H. LAUCKS — 2,679,257
TURBINE AND CONTROL MEANS THEREFOR
Filed Dec. 27, 1951 — 3 Sheets-Sheet 3

INVENTOR.
HOWARD H. LAUCKS
BY Herbert L. Davis Jr.
ATTORNEY

Patented May 25, 1954

2,679,257

UNITED STATES PATENT OFFICE 2,679,257

TURBINE AND CONTROL MEANS THEREFOR

Howard H. Laucks, Sparta, N. J., assignor to Bendix Aviation Corporation, Teterboro, N. J., a corporation of Delaware Application December 27, 1951, Serial No. 263,574

7 Claims. (Cl. 137—56)

This invention relates in general to turbines and more particularly has to do with a novel turbine of the tangential reaction or "pinwheel" type embodying a novel control valve or governor for controlling the rotational velocity thereof.

In turbines of the above type, a high pressure operating, or driving, fluid is delivered to a chamber formed in the hub of the turbine from whence it is passed through a suitable passage or passages formed in the radial arms of the turbine to the reaction nozzles thereof where it is effective to rotate the turbine. Since the rotational velocity of a turbine of the above type is a function of the pressure of the operating fluid delivered to its reaction nozzles, it is manifest that by controlling the pressure of the operating fluid delivered to the reaction nozzles the rotational velocity of the turbine may be controlled or regulated.

Turbines of the above type have found useful employment in many fields, and in particular, have been utilized in self-contained power units where the turbine is operatively associated with a generator of the unit to drive the same and produce a source of electrical energy or power. In a power unit of this type, it is desirable to maintain the power output of the generator at a substantially constant value, and to that end various pressure regulating means have been incorporated in such units for regulating or controlling the pressure of the operating fluid delivered to the turbine.

In copending application Serial No. 258,072, filed November 24, 1951, in the names of Walter D. Teague. Jr. and Emil A. Volk, Jr., Patent No. 2,642,543, January 16, 1953, there is shown a self-contained power unit wherein a tangential reaction turbine is used to drive the generator of the power unit. In the subject copending application, the conduit means conducting the operating fluid to the hub chamber of the turbine is provided with a pressure regulator assembly that is responsive to a pressure drop across the turbine and to the power output of the generator, to regulate the pressure of the operating fluid delivered to the hub chamber of the turbine. Thus, by regulating the pressure of the operating fluid delivered to the hub chamber, the rotational velocity of the turbine, and hence the power output of the generator is also regulated.

The instant invention, however, contemplates a novel tangential reaction turbine embodying novel control means that are responsive solely to the rotational velocity of the turbine to regulate the pressure of the operating fluid delivered from the hub of the turbine to the reaction nozzles thereof to the end that the rotational velocity of the turbine may be controlled or regulated to a predetermined value.

The present invention also contemplates and has for one of its objects, the provision of novel control valve means designed and constructed to be mounted within the hub chamber of a turbine of the above type and which is responsive to the speed of the turbine to control or regulate the pressure of the operating fluid delivered from the hub chamber to the reaction nozzles of the turbine.

Another object of the instant invention is to provide a novel valve wherein a movable valve element is designed and constructed so as to be responsive to centrifugal force induced by the rotation of the valve about a first axis to rotate about a second axis normal to the first axis, to the end that flow through the valve is controlled as a function of the rotational velocity of the valve about the first axis.

A further object contemplated by the present invention is the provision of novel means for mounting a centrifugal force responsive member whereby the movement of the member in response to centrifugal force is controlled.

The above and other objects and features of the instant invention will appear more fully hereinafter from a consideration of the following description taken in connection with the accompanying drawings wherein one embodiment of the instant invention is illustrated by way of example.

In the drawings, wherein like reference characters designate like parts throughout the several views, Fig. 1 is a longitudinal section through a self-contained power plant in which the novel turbine contemplated herein is utilized to drive a generator of the power unit;

Figure 1:
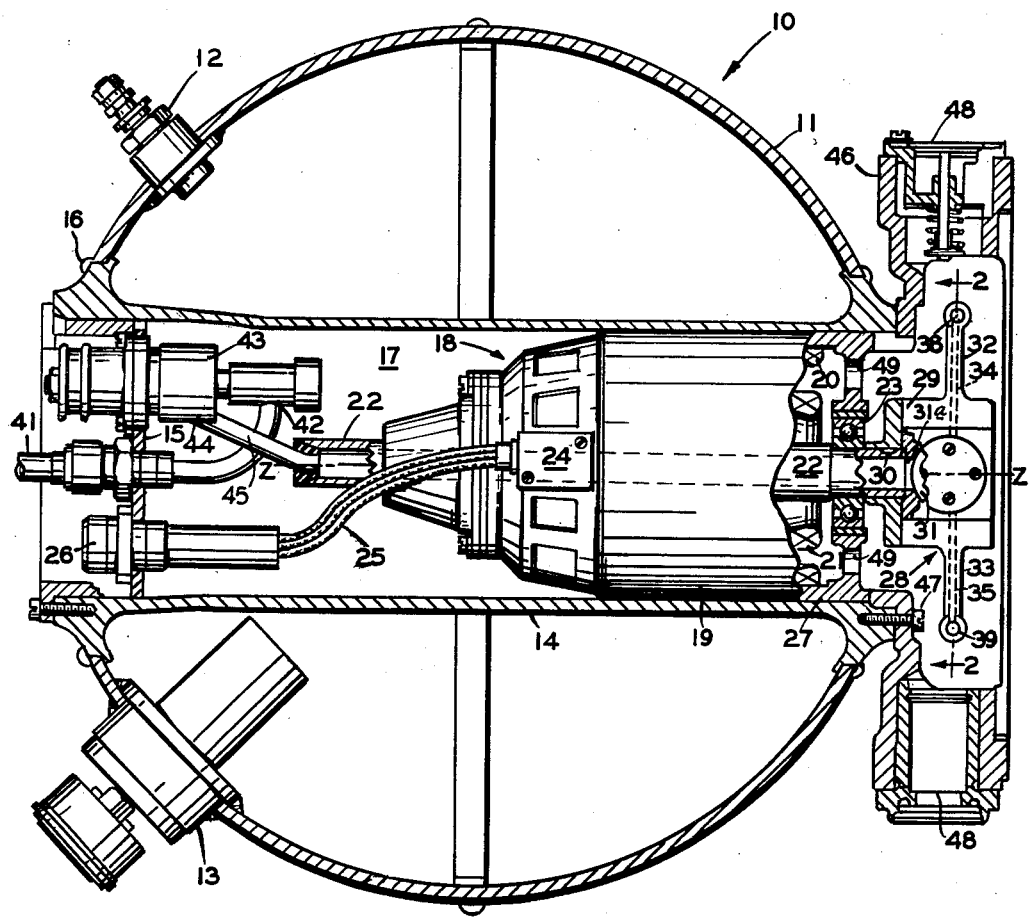

Referring now to the drawings, Fig. 1 shows a self-contained power unit 10 including a spherical container 11 having suitable inlet valve means 12 whereby a pressurized operating fluid is introduced into container 11 and a conventional pressure gauge 13 for indicating the pressure of the operating fluid stored therein. Container 11 therefore serves as a means for storing a pressurized fluid for operating power unit 10, as will become apparent from the following description.

A cylindrical sleeve 14, closed at one end by a wall 15, and extending between diametrically opposite ends of container 11 is secured thereto by rivets 16 to define a chamber 17 within container 11 for housing an electrical generator assembly 18 of the power unit 10.

Generator assembly 18 comprises a generator housing 19 that is fixedly secured in the end of sleeve 14 opposite to that closed by end wall 15, a stator 20 secured within housing 19, and a rotor 21 fixedly mounted on a hollow shaft 22 that is rotatably supported in bearings 23 (only one of which is shown) carried by housing 19. When generator 18 is operated, the electrical energy output thereof is conducted from a junction box 24 carried by housing 19 through suitable leads 25 to an outlet plug 26 mounted in end wall 15 where it is available for use.

The novel turbine contemplated herein, indicated generally by reference character 28, is in this instance, secured to one end of hollow shaft 22 where it is effective, as will hereinafter be more fully set forth, to drive, or rotate, rotor 21 relative to stator 20 to the end that generator assembly 18 is operated.

Turbine 28 includes a cylindrical hub 29 that is secured to shaft 22 by key 30, and a chamber 31 formed in hub 29 is provided with an inlet 31a that communicates with hollow shaft 22. Arms 32 and 33 which extend radially outwardly in opposite directions from hub 29 are provided with bores 34 and 35, respectively, and suitable outlets 36 and 37 from chamber 31, communicate with one end of bores 34 and 35, respectively. The opposite ends of bores 34 and 35 open into reaction nozzles 38 and 39 that are carried at, or adjacent to, the outer end of arms 32 and 33, respectively. To control communication between chamber 31 and 37 to bores 34 and 35, a control valve 40, which will hereinafter be more fully described, is mounted in chamber 31 and is operative to vary the effective cross-sectional areas of outlets 36 and 37.

To deliver the operating fluid from container 11 to hub chamber 31, container 11 is provided with a suitable outlet (not shown) and a conduit 41 connected at one end to the outlet of container 11 passes through end wall 15 into chamber 17 where the opposite end thereof is connected to an inlet 42 of a pressure regulator 43 that is mounted to wall 15 and positioned to extend into chamber 17. Thus, the pressurized fluid stored in container 11 is delivered through conduit 41 to pressure regulator 43. Pressure regulator 43 serves to reduce and regulate the pressure of the operating fluid delivered thereto to the end that it is delivered at a substantially constant pressure through an outlet 44 of the pressure regulator and a conduit 45 to the inner end of hollow shaft 22 from whence it passes into hub chamber 31 of turbine 28. From hub chamber 31, the operating fluid passes through outlets 36 and 37, bores 34 and 35 into the reaction nozzles 38 and 39, respectively, where it is effective on exhausting therefrom to rotate turbine 28.

As will hereinafter be more fully set forth, when turbine 28 reaches a predetermined rotational velocity, control valve 40 becomes operative to control or regulate the pressure of the operating fluid delivered from hub chamber 31 to the reaction nozzles 38 and 39 to the end that the rotational velocity, or speed, of turbine 28 is controlled so as to be maintained at a preselected value.

The operating fluid exhausting from nozzles 38 and 39 is at a substantially higher pressure than atmospheric pressure. To utilize this pressure to prevent undesirable arcing of generator 18 at high altitudes, turbine 28 is positioned in a turbine housing 46 that is secured to one end of sleeve 14 by bolts 47 and which is provided with pressure relief valves 48. The interior of housing 46 communicates with chamber 17 through suitable openings 49 formed in housing 19 of generator 18. Pressure relief valves 48 are adjusted to control the venting of the operating fluid to atmosphere so as to maintain a preselected pressure in chamber 17 that will prevent undesirable arcing of generator 18.

With the exception of turbine 28 and the control valve 40 thereof, the foregoing described power unit 10 forms no part of the instant invention, but has been shown and described solely for the purpose of illustrating a practical application of the present invention. It is understood that other uses of the turbine and control means therefore will be apparent to those skilled in the art.

Reference is now made to Figs. 2, 3, 4 and 5 wherein the details of the novel turbine and the governor thereof as contemplated by the present invention are shown.

As hereinbefore set forth, turbine hub 29 is provided with a chamber 31 that is adapted to receive the operating fluid from shaft 22, and control valve 40 controls or regulates the pressure of the operating fluid delivered from chamber 31 through outlets 36 and 37 to the bores 34 and 35. Thus, hub 29 serves, in effect, as a valve body having an inlet 31a, a chamber 31, outlets 36 and 37 and valve means 40 for controlling pressure delivered from the chamber to the outlets thereof.

Figure 2:
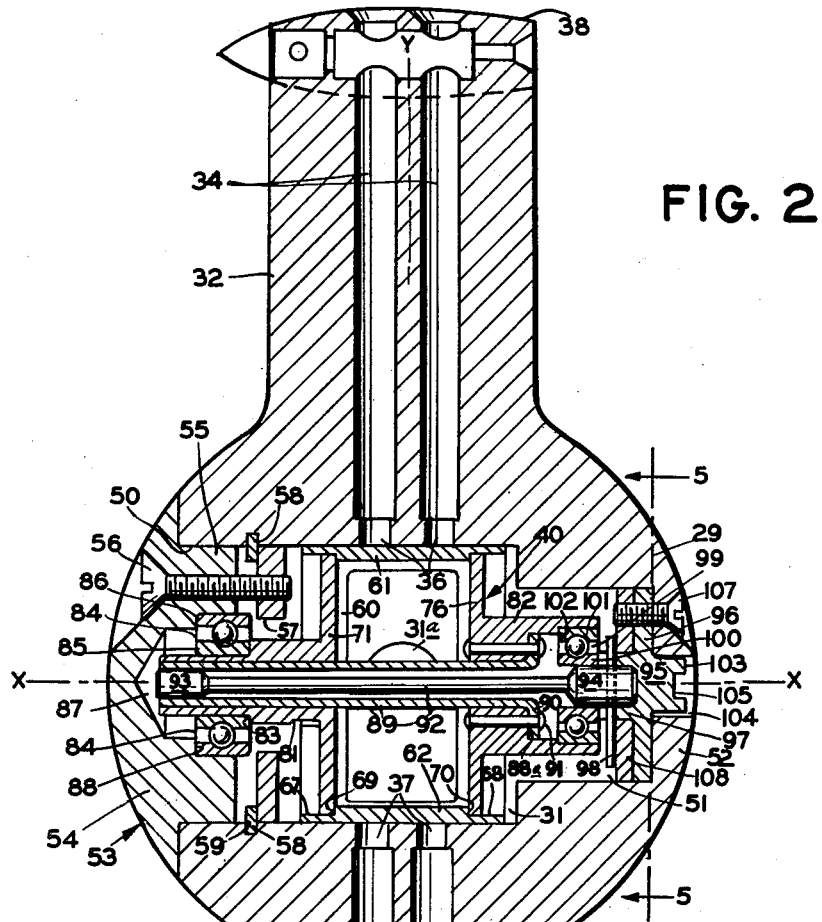
Fig. 2 is an enlarged sectional view through line 2—2 of Fig. 1.
Figure 6:
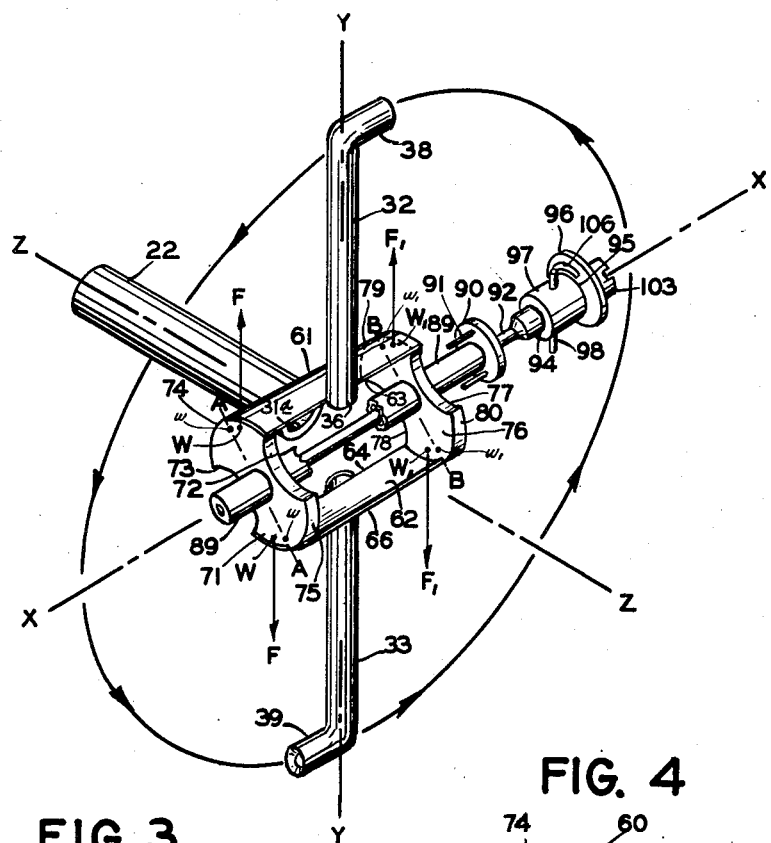
Fig. 6 is a diagrammatic sketch of the novel valve means of the instant invention.

To the above end, chamber 31 as shown in Figure 2 is cylindrical in form and is symmetrically disposed about an axis X—X of turbine 28 that is normal to and intersects a vertical axis Y—Y and the axis of rotation Z—Z of the turbine 28 shown in Figures 2 and 6. Furthermore, as shown in Figures 1 and 6 the inlet 31a of chamber 31 is symmetrically disposed about axis of rotation Z—Z and outlets 36 and 37 as shown in Figure 2 are disposed equidistant from inlet 31a and substantially on diametrically opposite sides of chamber 31. Chamber 31 as shown in Figure 2, is open at one end 50 while its opposite end 51 is somewhat smaller in diameter and is partially closed by an end wall 52. At the open end 50 thereof, chamber 31 is provided with a closure 53 having a head portion 54 and a cylindrical portion 55 adapted to be received and secured in the open end of chamber 31 to close the same. To secure closure 53 in operative position a plurality of bolts 56 pass through suitable openings formed in closure 53 and engage a mounting ring 57 that is slidably positioned within chamber 31. A snap ring 58 is operatively engaged in an annular groove 59 formed in hub 29 adjacent one end of chamber 31 and positioned between the inner end of closure 53 and mounting ring 57. Upon rotation of bolts 56 mounting ring 57 is drawn into engagement with snap ring 58 and closure 53 drawn into chamber 31 until the head portion 54 thereof engages hub 29. The outer surface of head portion 54 of closure 53 is formed to follow the contour of cylindrical hub 29.

Figure 4:
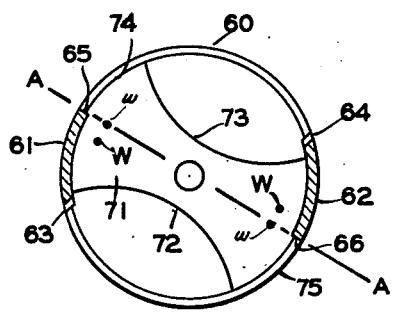
Fig. 4 is a section along lines 4—4 of Fig. 3.
Figure 3:
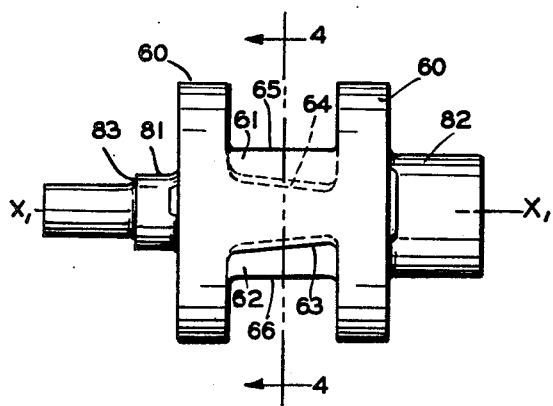
Fig. 3 is an elevation of the movable valve element of the valve means.

Control valve 40 as shown in Figures 2, 3 and 4, includes a hollow cylindrical valve member 60 that is designed to be supported within chamber 31 for rotation about axis X—X. It is noted that while valve member 60 and chamber 31 are dimensioned so as to permit free rotation of the former within the latter a minimum clearance is provided therebetween. As shown best in Figures 3 and 4, valve member 60 has side portions removed to define curved throttle vanes 61 and 62 on opposite sides thereof. Vanes 61 and 62 are provided with beveled leading edges 63 and 64, respectively, that are angularly disposed relatively to a longitudinal axis X'—X' of valve member 60. Vanes 61 and 62 are also provided with trailing edges 65 and 66 respectively, that are disposed parallel to the longitudinal axis X'—X' of valve member 60. As will hereinafter be more fully set forth when valve member 60 is rotated about axis X—X of the chamber 31 the leading edges 63 and 64 of vanes 61 and 62 are moved relatively to the outlets 36 and 37 to the end that the effective cross sectional areas thereof are varied and the pressure of the operating fluid passing from chamber 31 into bores 34 and 35 is regulated.

As shown in Figure 2, the opposite ends of cylindrical valve member 60 are recessed as at 67 and 68 to form annular shoulders 69 and 70 within valve member 60. An end plate 71, as shown in Figure 4, having concave opposite sides 72 and 73 and convex opposite ends 74 and 75 that are adapted to be received in recess 67 is fixedly mounted in recess 67 and positioned to bear against shoulder 69. An end plate 76 having concave opposite sides 77 and 78 and convex opposite ends 79 and 80 is similarly mounted in recess 68 to bear against shoulder 70. As shown best in Figure 4, end plate 71 is positioned relative to vanes 61 and 62 so as to have the leading edge 63 of vane 61, overhang the edge of end plate 71 formed by the junction of side 72 and end 74, and leading edge 64 of vane 62 overhang the edge of end plate 71 formed by the meeting of side 73 and end 75. End plate 76 is similarly positioned to the end that leading edge 63 of vane 61 overhangs the edge formed by the junction of side 77 and end 79, while leading edge 64 of vane 62 overhangs the edge formed by side 78 and end 80. When the end plates 71 and 76 are positioned as aforesaid, the trailing edges 65 and 66 of vanes 61 and 62, respectively, are positioned approximately on the center lines A—A and B—B of end plates 71 and 76, respectively, as shown in Figure 6.

To provide means whereby valve member 60 is mounted within chamber 31 for limited rotation about the horizontal axis X—X of turbine 28, end plates 71 and 76 have hollow, outstanding hubs 81 and 82, respectively, formed thereon. Hub 81 is provided medially of its length, with a shoulder 83 and an anti-friction bearing 84 having inner and outer races 85 and 86, respectively, is mounted on hub 81 and positioned so as to have the inner race 85 thereof abut shoulder 83. Closure 53 is centrally recessed as at 87 to house the outer end of hub 81 and a shoulder 88 formed in closure 53 adjacent the inner end of recess 87 engages the outer race 86 of bearing 83 when closure 53 is secured to hub 29, as hereinbefore set forth.

Hub 82 is recessed at the outer end thereof to define a shoulder 88a within hub 82. A resilient torque tube 89 having a flared end 90 that engages shoulder 88a and is secured thereto by suitable means such as rivets 91, extends through the remaining portion of hub 82, valve member 60 and hub 81 to the outer end of hub 81. Torque tube 89 is dimensioned to permit hub 81 to rotate thereon, although such relative movement is limited due to the securing of flange 90 to hub 82. A resilient torque rod 92 having an enlarged portion 93 at one end thereof that is secured by welding or other suitable means to the end of torque tube 89 positioned in hub 81 extends through tube 89 and an enlarged end portion 94 formed on the opposite end thereof extends partially beyond the limits of hub 82. A mounting and adjusting member 95 having an annular flange 96 that is adapted to be received in end 51 of chamber 31 and to abut the end wall 52 thereof, is provided with a cylindrical member 97 that is recessed at the inner end thereof to receive the outer end of end 94 of torque rod 92. A pin 98 passes through registered openings in member 97 and end 94 to secure torque rod 92 to adjusting member 95. An anti-friction bearing 99 having inner and outer races 100 and 101, respectively, is mounted on end 94 of torque rod 92 and positioned so as to have the inner race 100 thereof engage the inner end of member 97 of adjusting member 95, while the outer race 101 thereof engages an annular shoulder 102 formed within the recessed end of hub 82.

Figure 5:
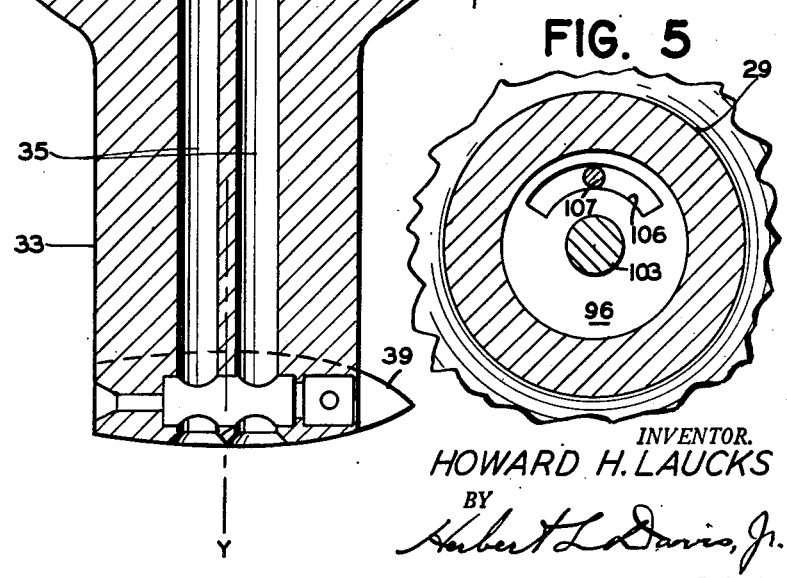
Fig. 5 is a section along lines 5—5 of Fig. 2.

To provide means whereby the position of valve member 60 may be adjusted within chamber 31 about axis X—X, adjusting member 95 has a cylindrical extension 103 formed thereon that extends partially through an opening 104 formed in end wall 52 of chamber 31. A notch 105 in the end of extension 103 is adapted to receive a screw-driver or other suitable tool. Flange 96 of adjusting member 95 is provided with an arcuate slot 106, as shown in Figure 5, and a screw 107 passes through end wall 52 and slot 106 to engage a threaded opening in a washer 108 that is slidably mounted on member 97. Thus, by inserting a suitable tool or screw-driver in notch 105, adjusting member 95 may be rotated within chamber 51 to the end that valve member 60 may be rotated about axis X—X so as to position leading edges 63 and 64 of vanes 61 and 62, respectively, relative to outlets 36 and 37, respectively. After the above adjustment screw 107 is rotated until flange 96 of adjusting member 95 is clamped between washer 108 and end wall 52 of chamber 31.

Reference is now made more particularly to Figure 6 wherein the novel turbine 28 and control valve 40 contemplated herein are shown schematically and wherein the various forces which serve to operate valve 40 upon the rotation of turbine 28 are illustrated. For purposes of clarity, only the vanes 61 and 62 of valve member 60 have been shown. Moreover, hub 29 and chamber 31 have not been shown, nor have the hubs 81 and 82 of end plates 71 and 76, respectively, and the means for rotatably supporting valve member 60 within chamber 31.

As above set forth, end plate 71 is formed so as to have concave opposite sides 72 and 73 and convex opposite ends 74 and 75, and end plate 76 is similarly formed with concave sides 77 and 78 and convex ends 79 and 80. Due to this construction, the greater portion of the weight of each end plate is disposed equally on diametrically opposite sides of each plate and adjacent the outer extremities thereof. Therefore, the center of weight W of each half of end plate 71 is actuated on the center line A—A thereof and adjacent the ends 74 and 75 and the center of weight W1 of each half of end plate 76 is similarly situated on the center B—B thereof.

However, since end plates 71 and 76 are disposed relatively to vanes 61 and 62 so as to position the latter on diametrically opposite sides thereof, and further since vanes 61 and 62, as shown in Figure 4, are dimensioned so as to extend only over substantially half the convex ends 74 and 79 and 75 and 80 of end plates 71 and 76, respectively, the centers of weight W and W1, are in effect shifted to one side of center lines A—A and B—B of the end plates. Thus, as shown in Figures 4 and 6 the reference characters W and W1 indicate the centers of weight of each half of each end plate that result from positioning of end plates 71 and 76 relative to vanes 61 and 62 as aforesaid. Moreover, it is apparent that the centers of weight W and W1 may be shifted relatively to center lines A—A and B—B, respectively, by varying the contours of end plates 71 and 76, or by adding weights thereto. Furthermore, the same effect can be achieved by varying the dimension of vanes 61 and 62 between the leading and trailing edges thereof, or by varying the relative positions of end plates 71 and 76 to vanes 61 and 62.

As previously described, end plate 76 is secured through its hub 82 to one end 90 of torque tube 89, the opposite end of torque tube 89 is welded to end 93 of torque rod 92, and the opposite end 94 of torque rod 92 is fixedly mounted in adjusting member 95, which in turn, is secured to hub 29. Moreover, means are provided whereby adjusting member 95 can be positioned and secured to hub 29 so as to locate vanes 61 and 62 in a predetermined position relative to outlets 36 and 37, respectively.

When turbine 28 is at rest, adjusting member 95 is positioned so as to locate vanes 61 and 62 intermediate inlet 31a and outlets 36 and 37 and, therefore, centers of weight W and W1 of end plates 71 and 76 are angularly disposed relative to vertical axis Y—Y of turbine 28, as shown in Figure 6. Due to this arrangement, when turbine 28 is rotated about axis Z—Z, the end plates 71 and 76 provide centrifugal force responsive elements in which centers of weight W and W1 induce in response to centrifugal force, couples indicated schematically in Figure 6 by letters F and F1 respectively, which rotate end plates 71 and 76 in a clockwise direction about axis X—X to move vanes 61 and 62 in the direction of outlets 36 and 37, i. e., plates 71 and 76 move in a direction so as to align centers of weight W and W1 with the vertical axis Y—Y of turbine 28. Since end plate 76 is secured through its hub 82 to one end of torque tube 89 and further since the end 94 of torque rod 92 is secured by adjusting member 95 against rotation about axis X—X, couples F and F1 in rotating end plates 71 and 76 also twist torque tube 89 and torque rod 92 about axis X—X to torsionally load the same.

It will be apparent to one skilled in the art that the torque produced by couples F and F1 in response to each rotational velocity, or speed, of end plates 71 and 76 about axis Z—Z is determined by the weight and location of centers of weight W and W1. By selecting a proper torque resisting modulus for tube 89 and rod 92, the torsional loading thereof is utilized to balance the torque produced by couples F and F1 at each speed of rotation about axis Z—Z to the end that vanes 61 and 62 are located in a predetermined position relative to outlets 36 and 37 at each predetermined rotational velocity of end plates 71 and 76 about axis Z—Z.

Thus, end plates 71 and 76 serve as torque producing elements that are operative in responsive to centrifugal force induced by the rotation thereof about axis Z—Z to rotate vanes 61 and 62 about axis X—X that is normal to and intersects the axis Z—Z, while torque tube 89 and torque rod 92 serve as means for regulating such rotation to the end that vanes 61 and 62 are positioned relative to outlets 36 and 37 to vary the effective cross-sectional area thereof, as a function of the speed of rotation of end plates 71 and 76 about axis Z—Z.

Due to the foregoing construction and arrangement of the parts, at a desired rotational speed of end plates 71 and 76 about axis Z—Z vanes 61 and 62 will have been rotated about axis X—X so as to position them partially across outlets 36 and 37 to the end that a predetermined effective cross-sectional areas of outlets 36 and 37 is established. In the event the rotational speed of end plates 71 and 76 about axis Z—Z decreases below this desired value, the magnitude of couples F and F1 decrease and the torsional loading of torque tube 89 and rod 92 is effective to rotate vanes 61 and 62 in a counterclockwise direction about axis X—X to thereby open or enlarge the effective cross-sectional areas of outlets 36 and 37. On the other hand, should the rotational speed of plates 71 and 76 about axis Z—Z increase above the desired value the magnitude of couples F and F1 increase and overcome the torsional resistance of torque tube 89 and rod 92 to the end that vanes 61 and 62 are rotated in a clockwise direction about axis X—X to close or decrease the effective size of outlets 36 and 37.

Having thus described the details of construction and operation of the novel turbine and control valve therefore as contemplated herein, it will be manifest to one skilled in the art that when power unit 10 is actuated as aforesaid, the operating fluid will be delivered at a substantially constant pressure through hollow shaft 22 to hub chamber 31 of turbine 28. Valve member 60 is initially adjusted so as to position vanes 61 and 62 intermediate hollow shaft 22 and outlets 36 and 37, therefore, the initial flow of the operating fluid is passed from chamber 31 through outlets 36 and 37 into bores 34 and 35 from whence it is delivered to reaction nozzles 38 and 39, respectively, where it is effective upon exhausting therefrom to rotate turbine 28. Since at this time vanes 61 and 62 are disposed away from outlets 36 and 37 they are fully open and the operating fluid is delivered at a relatively high pressure to bores 34 and 35.

As turbine 28 increases in speed toward a maximum desired speed end plates 71 and 76 induce couples F and F1 that become effective to rotate valve member 60 in bearings 84 and 99 in a clockwise direction about axis X—X. Therefore, vanes 61 and 62 are moved toward outlets 36 and 37 and torque tube 89 and torque rod 92 are torsionally loaded. When turbine 28 reaches the desired rotational velocity at which generator assembly 18 will be operated to supply a predetermined output of electrical energy, the torque produced by couples F and F1 is balanced by the torsional loading of torque tube 89 and 92. At this point, vanes 61 and 62 are partially disposed across outlets 36 and 37, respectively, to define predetermined effective cross-sectional areas of the same that are effective to deliver the operating fluid to the bores 34 and 35 and hence to reaction nozzles 38 and 39, at a pressure required to maintain the turbine speed at this value.

In the event the speed of turbine 28 falls below the value, the torsional loading of torque tube 89 and rod 92 will exceed the torque produced by couples F and F1. Therefore, vanes 61 and 62 will be rotated in a counterclockwise direction about axis X—X thereby opening or enlarging the effective cross-sectional areas of outlets 36 and 37, respectively, to the end that the operating fluid will be delivered at a higher pressure to the nozzles 38 and 39 and the speed of turbine 28 will be increased. Turbine 29 will then be restored to the desired value of speed in the manner above set forth.

On the other hand, should the speed of turbine 28 increase above the desired value, the torque produced by couples F and F1 will exceed the torsional loading of torque tube 89 and rod 92 and vanes 61 and 62 will move in a clockwise direction about axis X—X to decrease the effective cross-sectional areas of outlets 36 and 37, respectively, below the predetermined size. The operating fluid will therefore be delivered at a lower pressure to nozzles 38 and 39 and the speed of turbine 28 will be reduced. As turbine speed falls, the torsionally loading of torque tube 89 and rod 92 will restore vanes 61 and 62 to the position where they provide the desired cross-sectional areas for outlets 36 and 37, respectively, and the speed of turbine 28 is therefore restored to the desired value.

As shown in Figure 1, the novel turbine contemplated herein is shown as driving an electrical generator assembly 18 to deliver a desired normal output of electrical energy. Should the demand on the generator assembly 18 increase above the normal demand, additional power will be required to maintain the turbine at the desired speed. In this instance, therefore, vanes 61 and 62 are effective to provide cross-sectional areas for outlets 36 and 37, respectively, that are of a slightly larger size than normal to thereby insure the delivery of the operating fluid at a pressure sufficient to maintain the turbine velocity at its desired value. On the other hand, should the demand on generator assembly 18 decrease below the normal demand, vanes 61 and 62 are effective to decrease the normal cross-sectional areas of outlets 36 and 37 to the end that the desired turbine speed is maintained.

From the foregoing description of the construction and operation of the novel turbine, and control valve therefore, as contemplated herein, it will be apparent to one skilled in the art that various objects of the instant invention hereinbefore set forth, have been achieved.

While only one embodiment of the instant invention has been shown, it is understood that various changes in the construction and arrangement of the various elements forming the novel turbine and control valve may be made by those skilled in the art without departing from the scope of the invention. Moreover, it is understood that the novel turbine contemplated herein may be utilized in other fields than has hereinbefore been described, and that the turbine has been shown and described in association with a self-contained power unit, solely for the purpose of indicating one practical application of the instant invention.

I claim:

1. The combination with a valve constructed and arranged for rotation about a first axis and including a valve body having an inlet connected to a source of pressurized fluid, a chamber to receive the pressurized fluid from the inlet and an outlet for passing the pressurized fluid from said chamber, of means for regulating the pressure of the fluid passing through said outlet comprising a valve member including centrifugal force responsive end plates, means supporting said valve member in said chamber for rotation about said first axis and for rotation about a second axis normal to and intersecting the first axis and, a vane carried by said end plates and constructed and arranged to move relatively to said outlet to vary the effective cross-sectional area thereof upon rotation of said valve member about said second axis, said end plates being operative in response to centrifugal force induced by rotation of said valve member about said first axis to rotate said valve member about said second axis, whereby the effective cross-sectional area of said outlet is varied, and whereby the pressure of the fluid passing through said outlet is regulated as a function of the speed of rotation of said valve member about said first axis.

2. In a valve constructed and arranged for rotation about a first axis, the combination comprising a valve body, a cylindrical chamber in said body symmetrically disposed about a second axis normal to and intersecting said first axis, an inlet to said chamber symmetrically disposed about said first axis, for delivering a pressurized fluid to said chamber, a pair of outlets disposed equidistant from said inlet and on diametrically opposite sides of said chamber for passing the pressurized fluid from said chamber, a cylindrical valve member constructed and arranged to be received in said chamber, said valve member comprising a hollow cylinder open at the opposite ends thereof and having side portions removed to define vanes on diametrically opposite sides of said cylinder, each of said vanes having a leading and trailing edge, an end plate for each open end of said cylinder, each end plate having convex opposite sides secured to said cylinder and concave opposite sides extending between said convex sides, a first hollow hub extending outwardly from one of said end plates, a second hollow hub extending outwardly from the other of said end plates, a torque tube secured at one end to said second hub and extending through said second hub, valve member and first hub, a torque rod secured at one end to the end of said torque tube in said first hub and extending through said torque tube and beyond the limits of said second hub, an adjusting member rotatably received in said chamber for rotation about said second axis, and secured to the other end of said torque rod, a first bearing between said first hub and said valve body, a second bearing between said second hub and said torque rod, said bearings supporting said valve member in said chamber for rotation about said second axis, means for rotating said adjustment member in said chamber whereby said valve member is rotated in said chamber to locate said vanes relative to said outlets, and means for fixedly securing said adjustment member to said body, said end plates being responsive to centrifugal force induced by the rotation about said first axis to rotate said valve member about said second axis to move the leading edges of said vanes across said outlets and thereby vary the effective cross-sectional area of said outlets, and said torque tube and torque rod being effective to modify the rotation of said valve member about said second axis by said end plates whereby the rotation of said valve member about said second axis is a function of the speed of rotation of said valve member about said first axis.

3. In a valve constructed and arranged for rotation about a first axis, the combination comprising a valve body, a chamber in said body connected to a source of pressurized fluid, an outlet from said chamber, valve means in said chamber, means supporting said valve means in said chamber for rotation about a second axis normal to and intersecting said first axis, said valve means including spaced end plates, a vane carried by said end plates and movable across said outlet to vary the effective cross-sectional area thereof upon rotation of said valve means about said second axis, said end plates constructed and arranged for operation in response to the rotation of said valve means about said first axis to rotate said valve means about said second axis in one sense, and said mounting means including torque responsive means opposing the rotation of said valve means by said end plates in said one sense and affecting rotation of said valve means about said second axis in an opposite sense whereby said vane is moved across said outlet to vary the effective area thereof as a function of the speed of rotation of said valve means about said first axis, to thereby regulate the pressure passing from said chamber through said outlet as a function of the speed of rotation of said valve means about said first axis.

4. In a valve constructed and arranged for rotation about a first axis, the combination comprising a valve body, a cylindrical chamber in said body symmetrically disposed about a second axis normal to and intersecting said first axis, an inlet to said chamber for delivering a pressurized fluid to said chamber, a pair of outlets from said chamber for passing the pressurized fluid from said chamber, a cylindrical valve member constructed and arranged to be received in said chamber, said valve member comprising a hollow cylinder open at the opposite ends thereof and having side portions removed to define vanes on diametrically opposite sides of said cylinder, an end plate for each open end of said cylinder, each end plate having convex opposite sides secured to said cylinder and concave opposite sides extending between said convex sides, a torque tube secured at one end to one of said end plates and extending through said one end plate, valve member, and other end plate, a torque rod secured at one end to the other end of said torque tube in said other end plate and extending through said torque tube and beyond the limits of said one end plate, an adjusting member rotatably received in said chamber for rotation about said second axis and secured to the other end of said torque rod, bearing means supporting said valve member in said chamber for rotation about said second axis, means for rotating said adjustment member in said chamber whereby said valve member is rotated in said chamber to locate said vanes relative to said outlets, and means for fixedly securing said adjustment member to said body, said end plates being responsive to centrifugal force induced by the rotation about said first axis to rotate said valve member about said second axis to move said vanes across said outlets to thereby vary the effective cross-sectional area of said outlets, and said torque tube and torque rod being effective to modify the rotation of said valve member about said second axis by said end plates whereby the rotation of said valve member about said second axis is a function of the speed of rotation of said valve member about said first axis.

5. In a valve constructed and arranged for rotation about a first axis, the combination comprising a valve body, a cylindrical chamber in said body symmetrically disposed about a second axis normal to and intersecting said first axis, an inlet to said chamber for delivering a pressurized fluid to said chamber, a pair of outlets from said chamber for passing the pressurized fluid from said chamber, a cylindrical valve member constructed and arranged to be rotatably mounted in said chamber, said valve member comprising a hollow cylinder open at the opposite ends thereof and having side portions removed to define vanes on diametrically opposite sides of said cylinder, an end plate for each open end of said cylinder, each end plate having convex opposite sides secured to said cylinder and concave opposite sides extending between said convex sides, a torque tube secured at one end to one of said end plates and extending through said valve member, a torque rod secured at one end to the other end of said torque tube and extending through said torque tube and beyond the limits of said one end plate, an adjusting member rotatably received in said chamber for rotation about said second axis and secured to the other end of said torque rod, means for rotating said adjustment member in said chamber whereby said valve member is rotated in said chamber to locate said vanes relative to said outlets, and means for fixedly securing said adjustment member to said body, said end plates being responsive to centrifugal force induced by the rotation about said first axis to rotate said valve member about said second axis to move said vanes across said outlets to thereby vary the effective cross-sectional area of said outlets, and said torque tube and torque rod being effective to modify the rotation of said valve member about said second axis by said end plates whereby the rotation of said valve member about said second axis is a function of the speed of rotation of said valve member about said first axis.

6. In a valve constructed and arranged for rotation about a first axis, the combination comprising a valve body, a cylindrical chamber in said body symmetrically disposed about a second axis normal to and intersecting said first axis, an inlet to said chamber for delivering a pressurized fluid to said chamber, an outlet from said chamber for passing the pressurized fluid from said chamber, a cylindrical valve member constructed and arranged to be received in said chamber, said valve member comprising a hollow cylinder open at the opposite ends thereof and having side portions removed to define at least one vane thereon, an end plate for each open end of said cylinder, each end plate having convex opposite sides secured to said cylinder and concave opposite sides extending between said convex sides, a torque tube secured at one end to one of said end plates, a torque rod secured at one end to the opposite end of said torque tube and extending through said torque tube and beyond the limits thereof, and means for fixedly securing said torque rod to said body, said end plates being responsive to centrifugal force induced by the rotation about said first axis to rotate said valve member about said second axis to move said vane across said outlet to thereby vary the effective cross-sectional area of said outlet, and said torque tube and torque rod being effective to modify the rotation of said valve member about said second axis by said end plates whereby the rotation of said valve member about said second axis is a function of the speed of rotation of said valve member about said first axis.

7. In a valve constructed and arranged for rotation about a first axis, the combination comprising a valve body, a chamber in said body symmetrically disposed about a second axis normal to and intersecting said first axis, an inlet to said chamber for delivering a pressurized fluid to said chamber, an outlet from said chamber for passing the pressurized fluid from said chamber, a valve member constructed and arranged to be rotatably mounted in said chamber, said valve member comprising a hollow body open at the opposite ends thereof and having portions removed to define at least one vane thereon, an end plate for each open end of said cylinder, each end plate constructed and arranged to be responsive to centrifugal force upon the rotation of said valve member about said first axis, a torque tube secured at one end to one of said end plates, a torque rod secured at one end to the opposite end of said torque tube and extending through said torque tube and beyond the limits thereof, and means for fixedly securing the other end of said torque rod to said body, said end plates being responsive to centrifugal force induced by the rotation about said first axis to rotate said valve member about said second axis to move said vane across said outlet to thereby vary the effective cross-sectional area of said outlet, and said torque tube and torque rod being effective to modify the rotation of said valve member about said second axis by said end plates whereby the rotation of said valve member about said second axis is a function of the speed of rotation of said valve member about said first axis.

References Cited in the file of this patent

UNITED STATES PATENTS

| Number | Name | Date |
|---|---|---|
| 444,938 | Kinkaid | Jan. 20, 1891 |
| 1,720,652 | Van Hamersveld | July 9, 1929 |
| 1,723,589 | Van Hamersveld | Aug. 6, 1929 |
| 2,080,243 | Warner | May 11, 1937 |

FOREIGN PATENTS

| Number | Country | Date |
|---|---|---|
| 517,533 | France | Dec. 18, 1920 |
| 924,659 | France | Mar. 10, 1947 |